Aug. 8, 1961

W. T. WAGNER 2,994,890

SPRING REINFORCED MATTRESSES

Filed Nov. 8, 1956

WILLIAM T. WAGNER
INVENTOR.

BY Reuben Wolk
ATTORNEY

United States Patent Office 2,994,890
Patented Aug. 8, 1961

2,994,890
SPRING REINFORCED MATTRESSES
William T. Wagner, Dayton, Ohio, assignor to Dayco Corporation, a corporation of Ohio
Filed Nov. 8, 1956, Ser. No. 621,069
1 Claim. (Cl. 5—351)

This invention relates to mattresses and the like, and more particularly to cellular elastomeric mattresses of improved construction. The invention further provides an improvement in methods for molding spring reinforced mattresses and similar articles.

Mattresses of plastic and rubber materials have come into wide use in recent years. Attempts are constantly being made to improve their construction to provide increased strength, wear, and comfort characteristics thereto.

It is a primary object of the present invention to devise a mattress of cellular elastomeric material which utilizes a minimum of material and integrally incorporates spring elements to provide a mattress of great strength and resiliency thereby in a highly economical and efficient manner.

The invention produces improvements in economy and quality relative the mattresses of the prior art. It provides for the molding of sections of material to provide core openings in opposite surfaces thereof and integrally molding reinforcing springs within the material about the cored portions in the process. The invention further provides that a plurality of reinforced mattresses of an identical nature may be produced by a single molding operation with no waste of material in the process. The method utilized is highly economical and provides an unusually resilient lightweight mattress having great strength and adaptability.

An object of the invention is to provide an improved method of fabricating spring reinforced mattresses and the like made of cellular elastomeric materials which eliminates waste of material and labor.

A further object of the invention is to provide a spring reinforced unit particularly providing improved cushioning, supporting, and shock absorbing characteristics.

A further object of the invention is to provide a method of molding spring element in bonded relation within cellular elastomeric materials to provide increased strength and resiliency thereto of a controlled nature.

A further object of the invention is to integrally mold spring elements within such materials to provide improved mattress and bodily comfort devices thereby.

An additional object of the invention is to provide an improved spring reinforced cellular elastomeric unit and a method for fabricating the same possessing the advantageous structural features, the inherent meritorious characteristics, and the mode of operation herein described.

With the above and other objects in view, as will more fully appear in the specification, the invention intended to be protected by Letters Patent consists of the features of construction, the parts and combinations thereof and the mode of operation hereinafter described or illustrated in the accompanying drawings or their equivalents.

Referring to the drawings wherein is found one but obviously not necessarily the only form of embodiment and practice of the invention:

Figure 1:
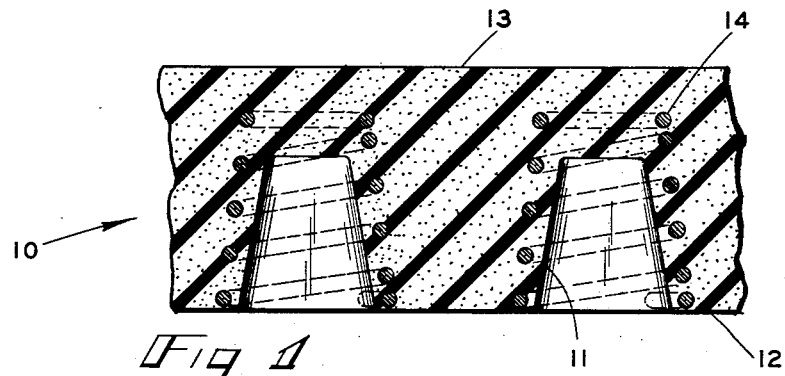
FIGURE 1 is a vertical cross-sectional view of a portion of the novel device described in my invention.

An illustrative embodiment of the invention is shown in the drawings. As seen in FIGURE 1, the improved mattress unit consists of a block or body 10 of cellular elastomeric material such as foam rubber or foamed polyurethane. The body has core openings 11 in one face 12 while the opposite face 13 is planar in nature. Integrally molded and bonded in the foamed plastic block 10 within the material about the core openings are coil springs 14 which extend from immediately adjacent to but short of the surface 12 inwardly beyond the inner extent of the core openings 11. In this way spring reinforcement is integrally provided within the foam material and locked thereto.

Figure 2:
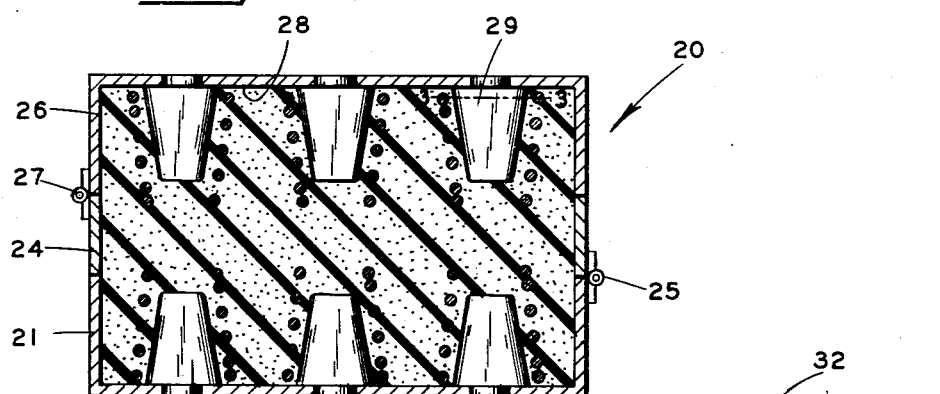
FIGURE 2 is a cross-sectional view of the mold assembly employed in the fabrication of the improved unit of the invention, showing the product as molded therein.

The novel method by which the improved product is fabricated employs a three section mold assembly 20 illustrated in FIGURE 2 of the drawings. Mold 20 includes a base mold section 21 of a rectangular nature having a bottom 22 mounting spaced core pins 23 fixed to project upwardly therefrom. A rectangular frame 24 is hinged at one side 25 to one side of the base section 21 to be superimposed on and form a vertical continuation of the section 21. A rectangular top mold section 26 is hinged at 27 to the opposite side of the central frame 24 to be superimposed on the vertically stacked sections 21 and 25 and complete the mold assembly thereby. The top mold section 26 provides a cover 28 having core pins 29 fixed to project inwardly of the mold sections in oppositely disposed relation to the core pins 23 projecting upwardly from the bottom.

Figure 3:
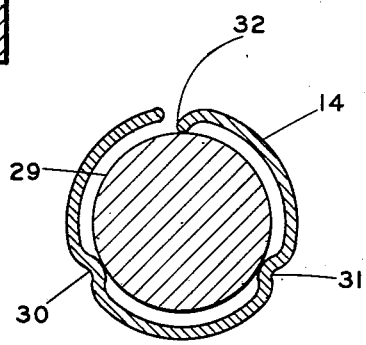
FIGURE 3 is a sectional view taken long lines 3—3 of FIGURE 2, illustrating the method of supporting the upper springs.
Figure 4:
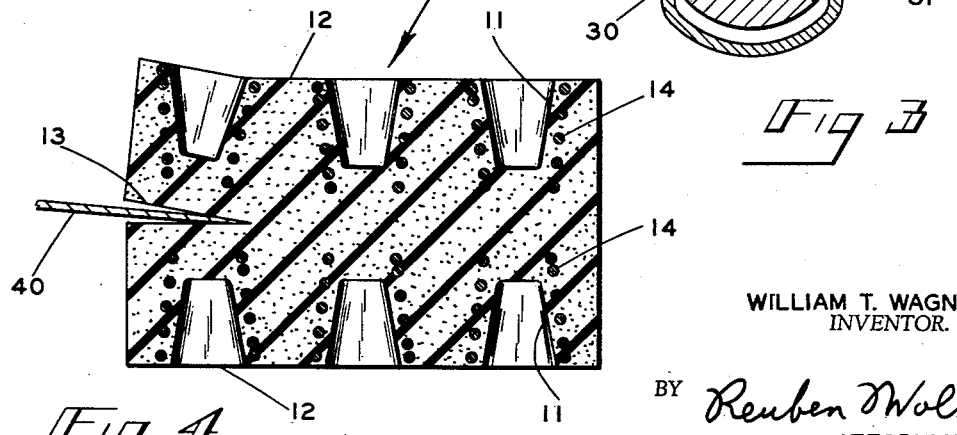
FIGURE 4 illustrates the splitting of the product of the mold of FIGURE 2 to provide duplicate mattress elements in accordance with the invention.

In the practice of the invention, coil springs 14 of steel wire are placed concentrically about the core pins 23 within the base section of the mold assembly. The springs are preferably dimpled to make selective point contact with the core pins for fixing their positions within the mold. Similarly, coil springs 14 are concentrically mounted about the opposite core pins 29 projecting inwardly of the top mold section 26. The springs 14 are dimpled to frictional engagement with the core pins 29 in at least three points so as to temporarily fix them relative the depending pins 29 within the mold assembly during the molding operation. This dimpling is illustrated in FIGURE 3, in which the dimpled portions 30 and 31 of the base portion of spring 14 are clearly shown. These portions, as well as the inwardly dimpled end 32 of the spring, serve to keep the spring in contact with core pin 29.

Suitable means are provided for introducing the foam material within the mold assembly 20. The material is then molded in the well-known manner and frozen into its molded condition about springs 14. The molded reinforced body 33 is then removed from the hinged mold assembly 20. The body 33, as shown, is provided with recesses 11 formed by the core pins which are oppositely disposed within the molded body. These recesses are surrounded by the coil springs 14 which have been integrated in and bonded to the material. The block is then slit by a suitable knife element 40 in a plane equi-distantly spaced from and parallel to the cored faces. As a result, two identical mattress units 10 are formed as shown in FIGURE 1. The hard surface skin which is usually found on the smooth surface during single mattress molding is completely eliminated and no waste material results since trimming is completely unnecessary. An extremely thorough bond between the wire springs and the foam material results, whether foam rubber or polyurethane is used.

The manner and position of integration of the springs in the body creates a substantial strength factor in the resultant mattress product in supportive relation to its resilient and lightweight construction. The coring of the mattress body not only increases the mattress flexibility but provides a considerable material savings. The process further lends itself to a highly economical operation. A highly advantageous and economical mattress product thus results.

It will be readily obvious that the invention can be applied to provide similar materials dependent on strength, minimum weight, resilience and bodily comfort characteristics for quality and effectiveness in application.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claim.

Having thus described my invention, I claim:

A cushioning unit comprising a body of cellular elastomeric material having upper and lower surfaces, said body having spaced recesses molded therein and extending to said lower surface, and spring elements integrally and substantially completely molded within said body concentrically of said recesses to provide additional support for said body said spring elements having spaced inwardly extending dimples molded within said body except for exposed innermost portions thereof, one end of said spring adjacent to but short of said lower surface and the other end of said spring extending beyond the inner extent of said recesses.

References Cited in the file of this patent

UNITED STATES PATENTS

| | | |
|---|---|---|
| 1,725,479 | Rissmann | Aug. 20, 1929 |
| 2,192,601 | Mattison | Mar. 5, 1940 |
| 2,194,036 | Talalay | Mar. 19, 1940 |
| 2,194,569 | Rumpf | Mar. 26, 1940 |
| 2,247,543 | Bernstein | July 1, 1941 |
| 2,415,765 | Schmidt | Feb. 11, 1947 |
| 2,757,415 | Mathues et al. | Aug. 7, 1956 |
| 2,785,440 | Toulmin | Mar. 19, 1957 |
| 2,830,306 | Wagner et al. | Apr. 15, 1958 |
| 2,882,959 | Burkart | Apr. 21, 1959 |

FOREIGN PATENTS

| | | |
|---|---|---|
| 709,641 | France | May 20, 1931 |
| 539,958 | Great Britain | Sept. 30, 1941 |